United States Patent
Wen (12)

(10) Patent No.: US 6,343,765 B1
(45) Date of Patent: Feb. 5, 2002

(54) TWO-PIECE REEL STRUCTURE

(75) Inventor: Chi-Jui Wen, Kaohsiung (TW)

(73) Assignee: Lucidity Technology Co., Ltd., Kaohsiung (TW)

( * ) Notice: Subject to any disclaimer, the term of this patent is extended or adjusted under 35 U.S.C. 154(b) by 0 days.

(21) Appl. No.: 09/689,756

(22) Filed: Oct. 13, 2000

(51) Int. Cl.⁷ .......................... B65H 75/14; B65H 75/18
(52) U.S. Cl. ................... 242/609.1; 242/609.3
(58) Field of Search ............... 242/609.1, 609.3, 242/608.5, 608.6, 118.6

(56) References Cited

U.S. PATENT DOCUMENTS

| | | | | |
|---|---|---|---|---|
| 4,726,534 A | * | 2/1988 | Chenoweth | 242/609.3 |
| 5,524,850 A | * | 6/1996 | Liao | 242/609.3 |
| 5,779,186 A | * | 7/1998 | Bakker et al. | 242/609.1 |

* cited by examiner

Primary Examiner—John M. Jillions
(74) Attorney, Agent, or Firm—Rabin & Berdo, P.C.

(57) ABSTRACT

A two-piece reel structure for taking up an elongated tape, such as a magnetic tape, a film and the like, is provided. The reel includes two similar halves, each of which includes a frustum-shaped central shaft portions. A bottom plane of each frustum is provided with a plurality of engaging means and receiving holes. Each of the engaging means includes a hook portion adapted to engage with a flat projection in the receiving hole on another half reel and a tongue portion located at one end of the hook portion and adapted to press a free end against an edge of the receiving hole opposite to the flat projection to prevent the hook portion from disengaging from the flat projection. By engaging the engaging means on a first half reel with the receiving holes on a second half reel and then turning the two half reels in opposite directions, the two half reels can be easily and firmly connected to each other to provide a complete reel.

6 Claims, 4 Drawing Sheets

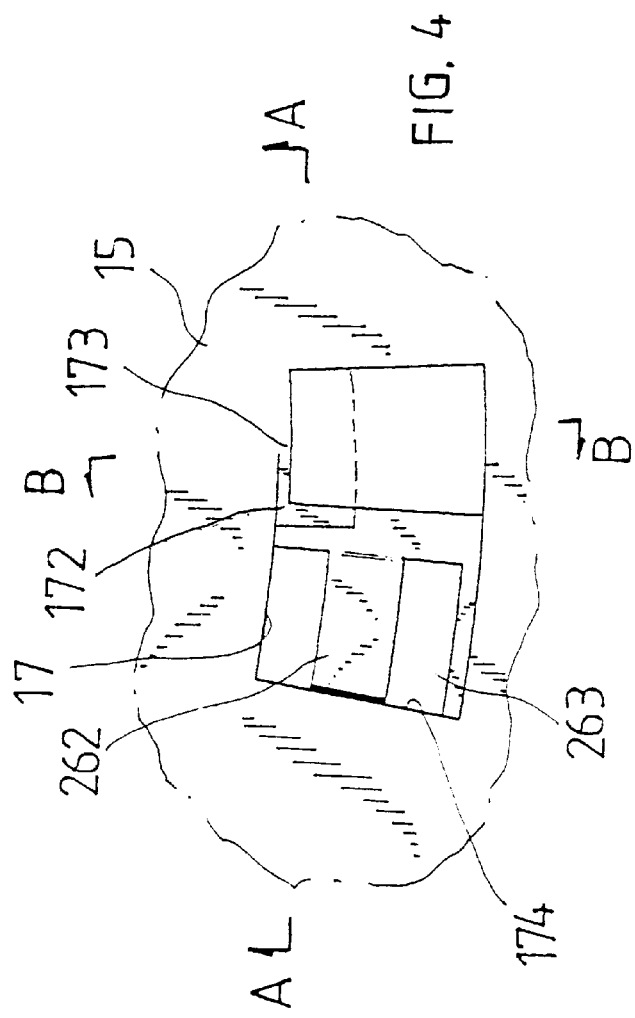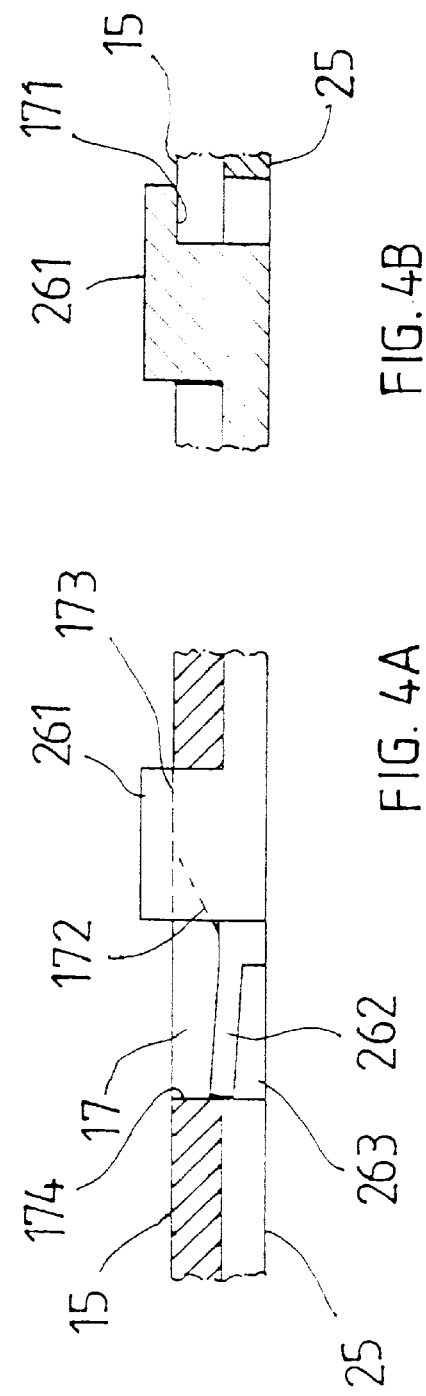
FIG. 4
FIG. 4A
FIG. 4B

TWO-PIECE REEL STRUCTURE

FIELD OF THE INVENTION

The present invention relates to a reel structure, and more particularly to a two-piece reel structure. Each half of the reel structure is provided at a bottom plane of a central shaft portion thereof with a plurality of alternately spaced engaging means and receiving holes. The engaging means on a first half reel is adapted to extend through the receiving hole on a second half reel to easily and firmly connect the two half reels to each other to provide a complete reel.

BACKGROUND OF THE INVENTION

Elongated tapes, such as magnetic tapes and films, are usually wound around a reel for storage of the tapes. A reel generally includes a central shaft portion and two diameter-expanded circular walls attached to two ends of the shaft portion.

Taiwan New Utility Model Patent Application No. 86210602 discloses a tape reel assembled from two similar female discs and a male shaft. The female disc each includes a central shaft hole, along an outer periphery thereof three sets of arcuate slots and locating holes are provided for engaging with three hooks and three locating tenons, respectively, provided on the male shaft. In this design, three components, namely, two female discs and one male shaft are needed to form a complete reel and it is inconvenient to assemble these three components to one another. Moreover, the three components occupy considerable large space that causes difficulty in storing the components.

U.S. Pat. No. 4,726,534 discloses a two-piece reel structure. In this invention, each half of the two-piece reel includes an inward depressed shaft portion. On each shaft portion, there is provided with lugs and locking lips for locking two halves of the reel into one unit. An advantage of this prior art is that the half reels before assembling could be stacked for easy storage and conveyance. And, only one mold is needed to produce the two halves of the reel and therefore largely reduces the manufacturing cost of the reel. However, the lugs of the reel of this prior art are staggered on the two halves of the reel that necessitates alignment of both lugs in one set with adjoining sliding grooves to assemble the two halves together. That is, there are two force-applying points created in assembling the two lugs with their corresponding sliding grooves. When there are six sets of lugs to be assembled, there shall be total twelve force-applying points. The assembling of the two halves of reel is therefore difficult. Moreover, the lugs and the sliding grooves are small in dimensions and the lugs tend to have inaccurate inclinations when they are molded, causing problems in smooth assembling of the two halves of the reel. Another problem with the invention of U.S. Pat. No. 4,726,534 is that the locking lip each has a reversed U-shaped cross section for extending into a corresponding hole and being locked thereto. Due to the reversed U shape, the locking lip has poor flexibility and therefore requires large pressure to force it into the corresponding hole.

It is therefore desirable to develop a reel structure that can be easily and firmly assembled from minimum components.

SUMMARY OF THE INVENTION

A primary object of the present invention is to provide a two-piece reel structure in which two halves of the reel can be quickly assembled to one another through easy alignment and engagement of perpendicular hook portions on a first half with corresponding receiving holes on a second half to form a complete reel.

Another object of the present invention is to provide the above two-piece reel structure in which elastic tongue portions are included in locking means provided on each half of the reel, so that locking of two halves of the reel together through the locking means can be achieved with reduced efforts.

A further object of the present invention is to provide the above two-piece reel structure in which the receiving holes and the hook portions have curved longitudinal edges to allow smooth turning of two halves of the reel relative to each other for the hook portions to locate in the receiving holes at a locked position. A still further object of the present invention is to provide the above two-piece reel structure in which the two halves of the reel before assembling can be stacked to save space needed for storage and conveyance of the reel.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3A is a fragmentary and enlarged perspective of the circled area A in FIG. 3 with a portion thereof cut away to better show the engagement of the engaging means with the receiving hole on the two-piece reel;

FIG. 3B is a fragmentary and enlarged perspective of the circled area A of FIG. 3 viewed from another visual angle;

FIG. 4 is a fragmentary and enlarged top plan view of the engaging means engaged into the receiving hole;

FIG. 4A is a sectional view taken on line A—A of FIG. 4 to show the engagement of the hook portion of the engaging means with the flat projection in the receiving hole; and FIG. 4B is a sectional view taken on line B—B of FIG. 4 to show the declined front part and the horizontal rear part of the flat projection in the receiving hole.

DETAILED DESCRIPTION OF THE PREFERRED EMBODIMENTS

Figure 1:
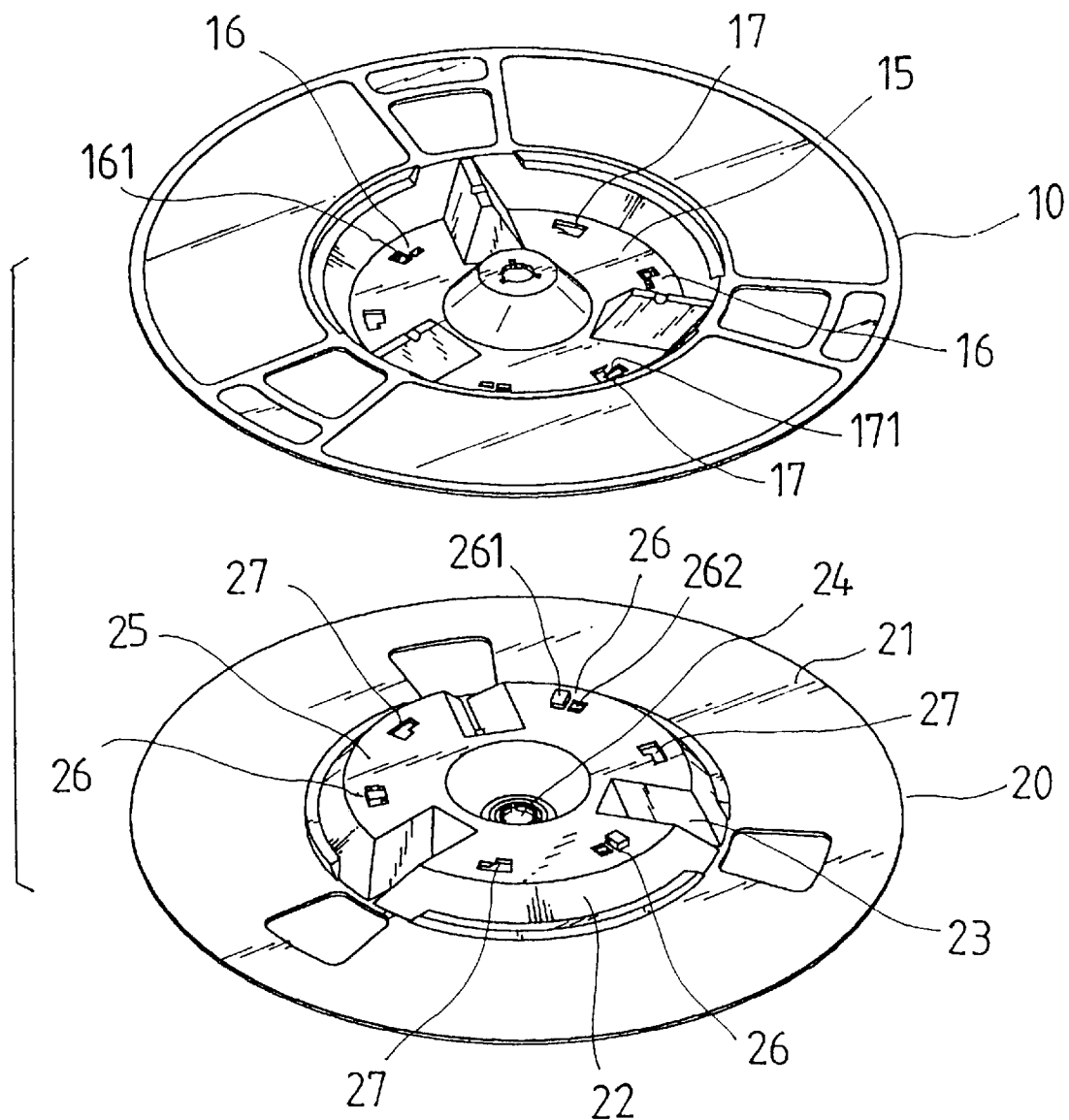
FIG. 1 is an exploded perspective of a two-piece reel structure according to the present invention.
Figure 2:
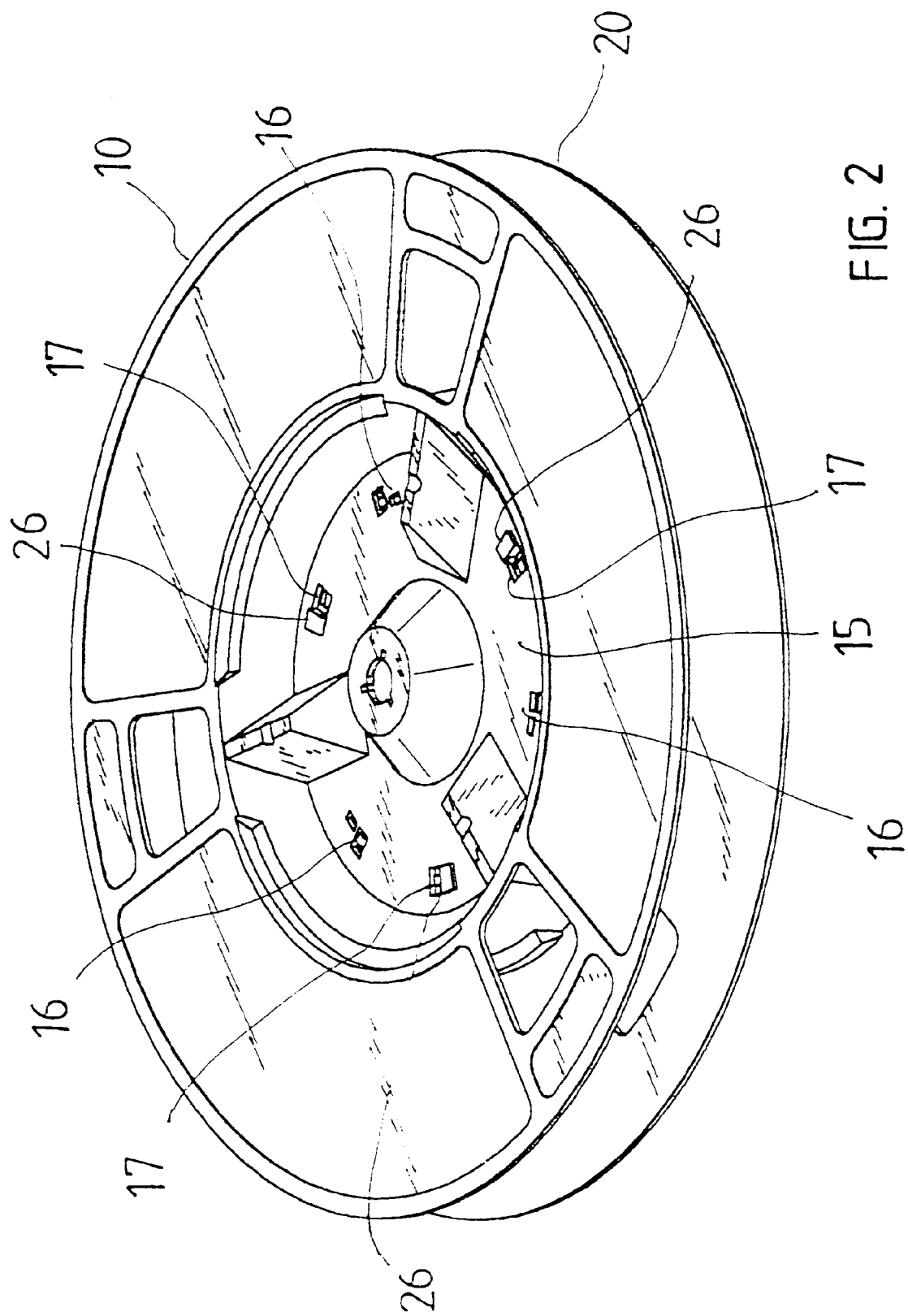
FIG. 2 is an assembled perspective of the two-piece reel structure of the present invention.

Please refer to FIGS. 1 and 2 that are exploded and assembled perspective views, respectively, of a two-piece reel structure according to the present invention. As shown, the two-piece reel structure of the present invention mainly includes a first half reel 10 and a second half reel 20 that are similar in their structure. For simplicity, the following description is made based on only the second half reel 20.

The second half reel 20 includes an annular peripheral wall portion 21 and a round central shaft portion 22 surrounded by the annular wall portion 21. The annular peripheral wall portion 21 is generally planar while the round central shaft portion 22 axially inward tapered to form an inward depressed frustum. The frustum-shaped shaft portion 22 includes a bottom plane 25, three reinforcing ribs 22 equiangularly spaced on an outer surface of the bottom plane 25, and a central shaft hole 24 centered at the bottom plane 25.

Figure 3:
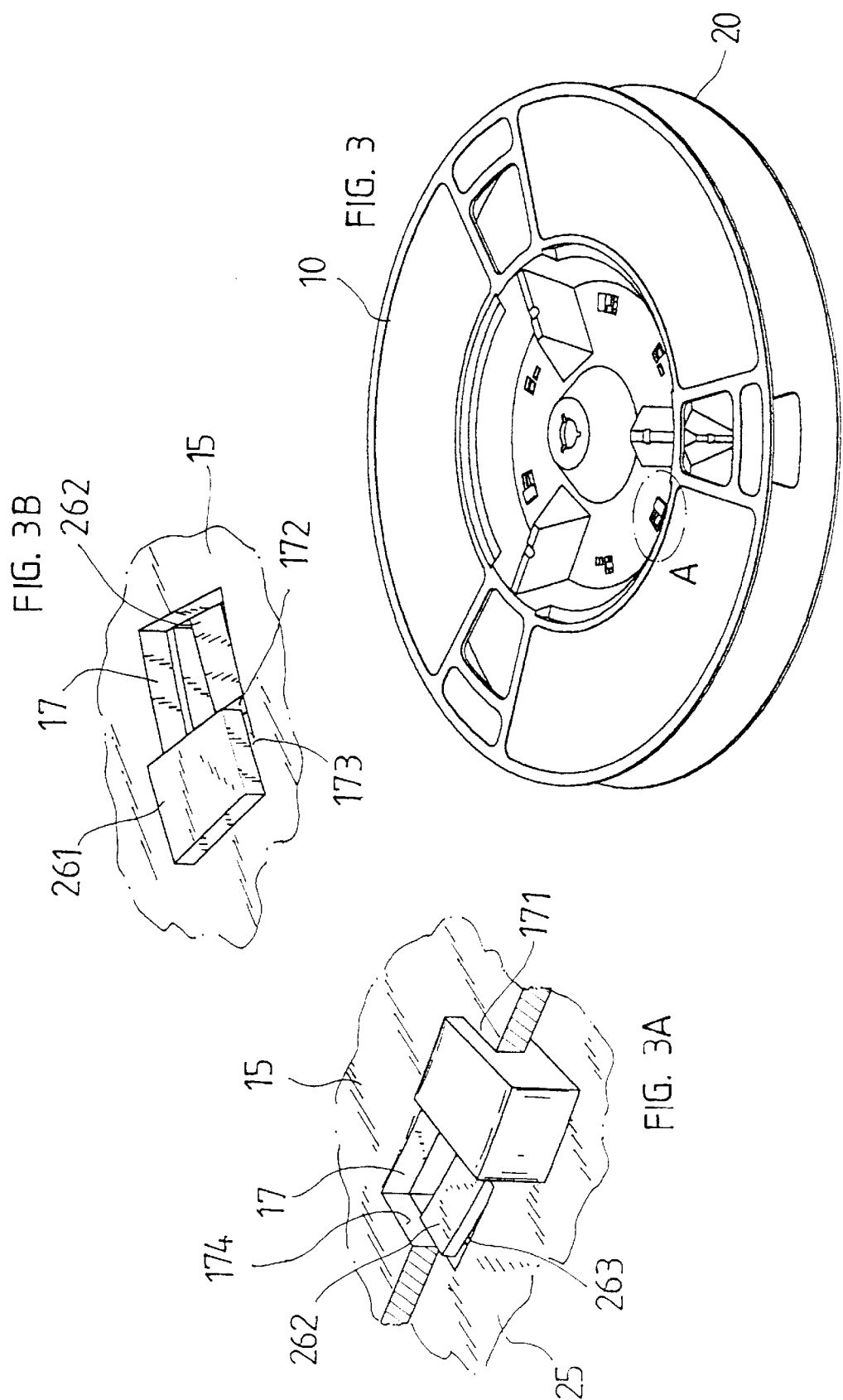
FIG. 3 is an assembled perspective of the two-piece reel structure of the present invention viewed from another visual angle.

There are also a plurality of locking means equiangularly spaced on the bottom plane 25. Each of the locking means includes an engaging means 26 provided on the second half reel 20 and a receiving hole 17 provided on the first half reel 10. On the bottom plane 25, receiving holes 27 identical to the receiving holes 17 are provided to engage with engaging means 16 provided on the first half reel 10. The circled area A in FIG. 3 indicates one of the engaging means on the bottom plane of the frustum-shaped shaft portion of the half reel 10. The engaging means 26 includes a hook portion 261 perpendicularly projected from an inner surface of the bottom plane 25, and an inclined tongue portion 262 located at one side of the hook portion 261. Please refer to FIG. 3A that is an enlarged and partially sectioned perspective of one of the locking means on the two half reels of the present invention. The receiving hole 17 includes two differently dimensioned portions. The portion of the receiving hole 17 having smaller dimensions is formed because there is a flat projection 171 inward extended into it. The flat projection 171 is adapted to engage with the hook portion 261 of the engaging means 26. The flat projection 171 includes a declined front part 172 and a horizontal rear part 173. Please refer to FIGS. 3B and 4A, the declined front part 172 of the flat projection 171 permits the hook portion 261 to smoothly slide toward and then get into contact with the horizontal part 173 to finally engage with the flat projection 171 and be held thereto, as shown in FIGS. 4 and 4A. The other portion of the receiving hole 17 having larger dimensions is slightly larger than the hook portion 261 to permit the latter to extend through the receiving hole 17 via the large portion. When the two half reels 10, 20 are put together with all the hook portions 261 separately extended through the large portions of the receiving holes 17, the two half reels 10, 20 may be turned relative to one another in opposite directions, so that the hook portions 261 are shifted into the small portions of the receiving holes 17 to engage with the flat projections 171.

The inclined tongue portion 262 of the engaging means 26 outward extends from the bottom plane 25 at an angle relative to the bottom plane 25. Portions of the bottom plane 25 surrounding the tongue portion 262 are cut away to provide an opening 263, so that the tongue portion 262 is elastically movable in the opening 263. When the two half reels 10, 20 are brought together with the hook portions 261 engaged with the flat projections 171, free ends of the elastic and inclined tongue portions 262 would separately press against edges 174 of the receiving holes 17 opposite to the flat projections 171, preventing the hook portions 261 from disengaging from the flat projections 171, as shown in FIGS. 3A, 4 and 4A.

It is very easy to assemble the first and the second half reels 10, 20. An operator needs simply to position the two halves 10, 20 in opposite directions as shown in FIG. 1, so that the bottom planes 15, 25 of their shaft portions closely contact with each other. Thereafter, align the hook portions 261 on the second half reel 20 with the large portions of the receiving holes 17 on the first half reel 10, and the hook portions 161 on the first half reel 10 with the large portions of the receiving holes 27 on the second half reel 20, and allow the hook portions 261 and 161 to extend through the receiving holes 17 and 27, respectively. Then, rotate the two half reels 10, 20 relative to each other in opposite directions, so that the hook portions 261 on the second half reel 20 slide along the declined front parts 172 to engage with the horizontal rear parts 173 on the first half reel 10, and the hook portions 161 on the first half reel 10 slide along the declined parts to engage horizontal parts in the receiving holes 27 on the second half reel 20. At this point, free ends of the elastic tongue portions of the engaging means 26 and 16 elastically move into the receiving holes 17 and 27 to press against the edges of the holes 17, 27 opposite to the flat projections, preventing the hook portions 261 and 161 from disengaging from the flat projections and thereby locking the first and the second half reels 10, 20 to each other.

It is to be noted that the receiving holes 17 and 27 have curved longitudinal edges corresponding to the circular shape of the two half reels 10, 20, and the hook portions 161 and 261 also have curved inner and outer sides corresponding to the curved receiving holes 17 and 27, as shown in FIG. 4. With the above-described curved configurations of the receiving holes and the hook portions, the two half reels 10, 20 may be more easily and smoothly turned relative to each other without the risk of forming any dead angle.

In the present invention, since the hook portions 261 extend in a direction perpendicular to the receiving holes 17, it is very easy to align the hook portions 261 with the receiving holes 17. And, since the hook portions 261 slide along the declined front parts 172 to the horizontal rear parts 173 of the flat projections 171 in the receiving holes 17 when the two half reels 10, 20 are turned relative to each other, the hook portions 261 would not disengage from the flat projections 171. Moreover, the openings 263 surrounding the inclined tongue portions 262 allow the latter to elastically spring into the receiving holes 17 and thereby save the operator from exerting efforts in locking the two half reels 10, 20 together.

It is possible for the frustum-shaped central shaft portion on the half reel to have different depth and thereby provides reels of differently sized shafts.

It is also possible to provide all the receiving holes on one of the two half reels and all the engaging means on the other half reel. And, numbers of the receiving holes and of the engaging means may be increased or decreased depending on actual need.

With the above arrangements, the two-piece reel structure of the present invention not only has advantages provided by the conventional two-piece reel structure, such as easy storage and conveyance, but also has advantages that are not found in the conventional structure, such as easy and effort-saving assembling. The present invention is therefore superior to the conventional similar structures.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A two-piece reel structure, comprising:

a first half reel including an annular peripheral wall portion and an axially inward tapered central shaft portion substantially in the form of a frustum; and a second half reel including an annular peripheral wall portion and an axially inward tapered central shaft portion corresponding to that of said first half reel;

said frustum-shaped central shaft portions of said first and said second half reels all including a bottom plane on which a plurality of engaging means and receiving holes are provided in a predetermined manner;

each of said engaging means including a hook portion axially inward extended from an inner side of said bottom plane to be perpendicular to said bottom plane, and a tongue portion inclinedly extended from one end of said hook portion toward an outer side of said bottom plane; and each of said receiving holes including a large-dimensioned portion large enough for said hook portion to extend therethrough and a small-dimensioned portion having a flat projection extended thereinto opposite to said large-dimensioned portion; and said hook portion of said engaging means extended through said large-dimensioned portion of said receiving hole being adapted to engage with said flat projection and be held thereto, and, when said hook portion being engaged with said flat projection, said inclined tongue portion of said engaging means pressing against an edge of said receiving hole opposite to said flat projection and thereby preventing said hook portion from disengaging from said flat projection.

2. A two-piece reel structure as claimed in claim 1, wherein said flat projection in said receiving hole includes a declined front part and a horizontal rear part, said declined front part allowing said hook portion of said engaging means to smoothly slide toward said horizontal rear part and fitly engage with said horizontal rear part and be held thereto.

3. A two-piece reel structure as claimed in claim 1, wherein said engaging means and said receiving holes are equiangularly and alternately spaced on said bottom planes.

4. A two-piece reel structure as claimed in claim 1, wherein said receiving holes have curved longitudinal edges corresponding to said annular wall portion and said hook portions have curved outer and inner sides corresponding to said curved longitudinal edges of said receiving holes, allowing said hook portions to smoothly slide along said flat projections in said receiving holes when said first and said second half reels are turned relative to each other in opposite directions.

5. A two-piece reel structure, comprising:
a first half reel including an annular peripheral wall portion and an axially inward tapered central shaft portion substantially in the form of a frustum; and
a second half reel including an annular peripheral wall portion and an axially inward tapered central shaft portion corresponding to that of said first half reel;
said frustum-shaped central shaft portions of said first and said second half reels all including a bottom plane; said bottom plane of said first half reel being provided with a plurality of engaging means, and said bottom plane of said second half reel being provided with a plurality of receiving holes corresponding to said engaging means on said first half reel;

each of said engaging means including a hook portion axially inward extended from an inner side of said bottom plane to be perpendicular to said bottom plane, and a tongue portion inclinedly extended from an end of said hook portion toward an outer side of said bottom plane; and each of said receiving holes including a large-dimensioned portion large enough for said hook portion to extend therethrough and a small-dimensioned portion having a flat projection extended thereinto opposite to said large-dimensioned portion; and said hook portion of said engaging means extended through said large-dimensioned portion of said receiving hole being adapted to engage with said flat projection and be held thereto, and, when said hook portion being engaged with said flat projection, said inclined tongue portion of said engaging means pressing against an edge of said receiving hole opposite to said flat projection and thereby preventing said hook portion from disengaging from said flat projection.

6. A half reel structure, comprising an annular peripheral wall portion and an axially inward tapered central shaft portion substantially in the form of a frustum; said frustum-shaped central shaft portion of said half reel including a bottom plane on which a plurality of engaging means and receiving holes are equiangularly and alternately spaced;

each of said engaging means including a hook portion axially inward extended from an inner side of said bottom plane to be perpendicular to said bottom plane, and a tongue portion inclinedly extended from an end of said hook portion toward an outer side of said bottom plane; and each of said receiving holes including a large-dimensioned portion large enough for a hook portion on another said half reel to extend therethrough and a small-dimensioned portion having a flat projection extended thereinto opposite to said large-dimensioned portion; and said flat projection being adapted to engage with said hook portion of said another half reel extended through said large-dimensioned portion and to hold said hook portion thereto; and said inclined tongue portion of said engaging means being adapted to press against a receiving hole of another said half reel at an edge of said receiving hole opposite to said flat projection when said hook portion is engaged with said flat projection, and thereby preventing said hook portion from disengaging from said flat projection on said another half reel.

* * * * *